(12) United States Patent
Bisdikian et al.

(10) Patent No.: US 8,539,018 B2
(45) Date of Patent: Sep. 17, 2013

(54) ANALYSIS OF IT RESOURCE PERFORMANCE TO BUSINESS ORGANIZATION

(75) Inventors: Chatschik Bisdikian, Chappaqua, NY (US); Joel W. Branch, Hamden, CT (US); Vasileios Pappas, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 335 days.

(21) Appl. No.: 12/939,657

(22) Filed: Nov. 4, 2010

(65) Prior Publication Data

US 2012/0116838 A1 May 10, 2012

(51) Int. Cl.
*G06F 15/173* (2006.01)
*G06F 17/30* (2006.01)

(52) U.S. Cl.
USPC .......... 709/200; 709/224; 709/220; 709/223; 709/229; 709/217; 705/7.36; 705/7.11; 705/7.28; 705/7.12; 705/7.38

(58) Field of Classification Search
USPC .................. 709/200, 220, 224, 223, 229, 217
See application file for complete search history.

(56) References Cited

U.S. PATENT DOCUMENTS

| | | | |
|---|---|---|---|
| 7,246,144 B2 * | 7/2007 | Walsh et al. | 709/200 |
| 7,320,016 B2 * | 1/2008 | Walsh et al. | 709/200 |
| 7,423,527 B2 * | 9/2008 | Bajwa et al. | 340/539.16 |
| 7,577,904 B1 * | 8/2009 | Obilisetty | 715/234 |
| 7,974,632 B2 * | 7/2011 | Karge et al. | 455/456.1 |
| 8,175,911 B2 * | 5/2012 | Cao et al. | 705/7.36 |
| 2003/0233249 A1 * | 12/2003 | Walsh et al. | 705/1 |
| 2005/0114201 A1 * | 5/2005 | Walsh et al. | 705/10 |
| 2005/0119905 A1 | 6/2005 | Wong et al. | |
| 2005/0197880 A1 * | 9/2005 | Walsh et al. | 705/8 |
| 2006/0020641 A1 * | 1/2006 | Walsh et al. | 707/203 |
| 2006/0074915 A1 * | 4/2006 | Bhandarkar et al. | 707/9 |
| 2006/0101134 A1 * | 5/2006 | Nocera et al. | 709/223 |
| 2006/0123022 A1 | 6/2006 | Bird | |
| 2007/0203740 A1 | 8/2007 | Abu et al. | |
| 2008/0288615 A1 * | 11/2008 | Bajwa et al. | 709/220 |

OTHER PUBLICATIONS

King, T., "Packet Sniffing in a Switched Environment," SANS Institute Reading Room site, Aug. 4, 2002 (updated Jun./Jul. 2006).
Crnovrsanin, T., et al., "Social Network Discovery based on Sensitivity Analysis", Proc. Intl. Conf. Advances in Social Networks Analysis and Mining (ASONAM 2009), Athens, Greece, Jul. 2009.

(Continued)

*Primary Examiner* — Jude Jean Gilles
(74) *Attorney, Agent, or Firm* — Scully, Scott, Murphy & Presser, P.C.; Preston J. Young, Esq.

(57) ABSTRACT

A system, method and computer program product for determining at least one association between at least one business process and at least one network entity. The system maps at least one user to the business process. The system maps the user to at least one network end-point. The system maps the network end-point to at least one application. The system maps the network entity to the application. The system identifies the association among the business process, the user, the network end-point, the application and the network entity based on one or more of the mappings.

20 Claims, 6 Drawing Sheets

(56) References Cited

OTHER PUBLICATIONS

Horton, J. L., "Net and Nodes: Social Network Analysis and PR," 2008, http://www.online-pr.com/Holding/Social_Network_analysis_article.pdf.

Berkhin, P., "Survey of Clustering Data Mining Techniques," 2002, Accrue Software, Inc.

Riley, M. C. et al., "Deep Packet Inspection: The End of the Internet As We know it?", Free Press, Mar. 2009.

Black, R., et al., "Ethernet Topology Discovery without Network Assistance," Proceeding of the 12th IEEE International Conference on Network Protocols (ICNP'04), 2004.

Flake, G. W., et al., "Graph Clustering and Minimum Cut Trees," Internet Mathematics, Sep. 2003, vol. 1, No. 4, pp. 385-408.

Smithson, A., et al., "Engineering an Agent-Based Peer-To-Peer Resource Discovery System," First International Workshop, AP2PC 2002.

Joukov, N., et al., "Built-to-Order Service Engineering for Enterprise IT Discovery," 2008 IEEE International Conference on Services Computing, Jul. 8-11, 2008.

Kahn, A., et al., "A Review of Machine Learning Algorithms for Text-Documents Classification," Journal of Advances in Information Technology, Feb. 2010, vol. 1, No. 1.

Murphy, K. P., "Linear regression," Mar. 13, 2007, http://citeseerx.ist.psu.edu/viewdoc/summary?doi=10.1.1.121.3661.

Xiao, H., et al., "Supporting Change Impact Analysis for Service Oriented Business Applications", International Workshop on Systems Development in SOA Environments (SDSOA'07), 2007, IEEE Computer Society.

Weinstein, M. A., "Planning Enterprise Networks to Meet Critical Business Needs", Enterprise Networking Mini-Conference, 1997. ENM-97. In conjunction with the ICC-97., First IEEE, Jun. 11-12, 1997, pp. 3-12.

Emig, C., et al., "Development of SOA-Based Software Systems—an Evolutionary Programming Approach", Proceedings of the Advanced International Conference on Telecommunications and International Conference on Internet and Web Applications and Services (AICT/ICIW 2006), 2006 IEEE Computer Society.

Bauknecht, K., et al., "E-Commerce and Web Technologies", 4th International Conference, EC-Web Prague, Czech Republic, Sep. 2-5, 2003, Proceedings, Springer, New York.

Serrat, O., "Social Network Analysis", Knowledge Solutions, Feb. 28, 2009, Asian Development Bank.

\* cited by examiner

ANALYSIS OF IT RESOURCE PERFORMANCE TO BUSINESS ORGANIZATION

GOVERNMENT CONTRACT

This invention was Government support under Contract No. W911NF-06-3-0001 awarded by U.S. Army. The Government has certain rights in this invention.

BACKGROUND

The present application generally relates to discovering associations between business processes, users, network end-points, applications and network entities. More particularly, the present application relates to an automated discovery and mapping of IT (Information Technology) resources to business processes.

Traditional IT departments maintain information about IT resources of an organization, e.g., servers, networks, applications, etc. Through manual operations, the traditional IT departments were possible to collect mappings between the IT resources in each organization. Such mappings can then be used to perform a number of management and troubleshooting operations, including, but not limited to: inventory management, project planning, impact analysis, root cause analysis, configuration checking, virtualization management, IT resource allocation, etc.

Unfortunately, traditional network management and IT resource mappings do not capture an impact of IT resource performance on business processes. Traditional IT resource management cannot react in an effective, automated manner to important business-oriented issues, e.g., how a specific IT resource performance degradation affects which business processes, organizations, projects, etc. Therefore, traditionally, no automated assessment of a business impact has yet to be made that would allow a proper notification, prioritized remediation and overall business-oriented reaction to the degradation.

Traditional IT resource management departments often require time-consuming manual operations to interact with each IT resource administrator to obtain listings of users that are registered to use a particular application. Sometimes, administrators are reluctant or refuse to openly reveal identities of the registered end-users. A traditional manual discovery process of IT resources used in each organization also does not scale well under a current dynamic IT environment, e.g., when users are changing frequently (e.g., due to new project assignments, etc.), when applications are changing (e.g., due to a replacement of old applications with new ones, etc.), and when IT resources are changing (e.g., due to an installation of new server devices, a relocation of server devices with virtual machine migration, network reconfigurations, etc.). Thus, traditional IT resource management departments fail to recognize an impact of a dynamic status change of an IT resource on a business process, e.g., due to the time-consuming manual operations and/or the traditional manual discovery process of IT resources.

SUMMARY OF THE INVENTION

The present disclosure describes a system, method and computer program product for determining at least one association between at least one business process and at least one network entity.

In one embodiment, there is provided a system for determining at least one association between at least one business process and at least one network entity. The system maps at least one user to the business process. The system maps the user to at least one network end-point. The system maps the network end-point to at least one application. The system maps the network entity to the application. The system identifies the association among the business process, the user, the network end-point, the application and the network entity based on one or more of the mappings.

In a further embodiment, the mapping the user to the business process includes one or more of: using a data mining algorithm and issuing a database query to a database associated with the user or the business process.

In a further embodiment, the mapping the user to the network end-points includes one or more of: using a network access authentication technique and using an application server that is aware of an identity of the user and an IP (Internet Protocol) address of the network end-point.

In a further embodiment, all the mappings are time-dependent and dynamically changing.

In a further embodiment, the mapping the network end-points to the application includes one or more of: snooping a network traffic between various network end-points, performing a deep packet inspection between the network end-points, and parsing application configuration files in a server device or a client device.

In a further embodiment, the mapping the network entity to the application uses a network topology discovery technique.

BRIEF DESCRIPTION OF THE DRAWINGS

The accompanying drawings are included to provide a further understanding of the present invention, and are incorporated in and constitute a part of this specification.

DETAILED DESCRIPTION

Figure 1:
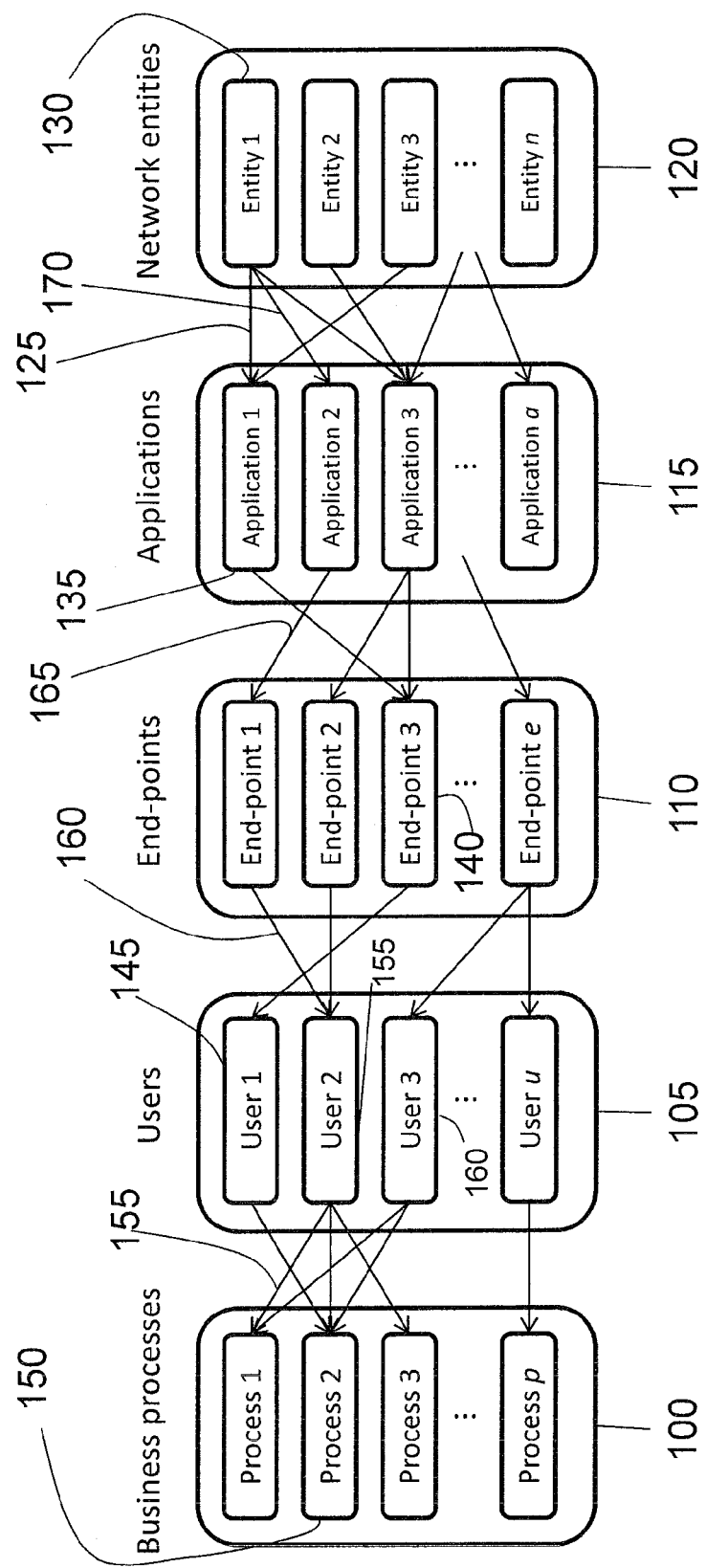
FIG. 1 illustrates exemplary mappings among business processes, users, network end-points, applications and network entities in one embodiment.

Enterprises (e.g., business entity, organization, institution, etc.) maintain extensive organizational charts residing in enterprise databases listing each employee of the enterprises, e.g., payroll listings, employee office/location listings, etc. These organizational charts can be used to map network end-points (e.g., an Ethernet port, MAC (Media Access Control) address, etc.) to employees that use them and, by extension, to an organization that the employees belong. Knowledge of IT resource performance (e.g., broken network connection, etc.) can thus be automatically communicated to the organization that will be impacted by the IT resource performance.

This above process (i.e., bridging the organization and the IT resource performance) enables a coarse impact analysis of IT resource performance on a business organization that could be impacted. Finer grain analyses are also possible. For example, through a statistical analysis (e.g., probability, linear correlation and regression, etc.) of an IT resource usage by particular employees, a computing system (e.g., a computing system 200 in FIG. 5) may identify heavy users of particular IT resources, e.g., by using a network traffic sniffing technique and/or social networking discovery technologies that identify relationships between network end-points. Tom King, "Packet Sniffing in a Switched Environment," SANS Institute Reading Room site, Aug. 4, 2002 (updated June/July 2006), wholly incorporated by reference as if fully set forth herein, describes network traffic sniffing techniques/tools. Tarik Crnovrsanin, et al., "Social Network Discovery based on Sensitivity Analysis," wholly incorporated by reference as if fully set forth herein, describes a social network discovery technique. By using social network discovery techniques or equivalent techniques (e.g., social network analysis technique, etc.), the computing system 500 can identify associations/affiliations between organizations and their employees. These social network discovery techniques, for example, may not only enable an identification of the employees that are primarily affected by an IT resource incident (e.g., an email server device is downed, etc.), but also enable an identification of broader groups of people that collaborate and hence may also be impacted by the incident. For example, a social network (e.g., IBM® SmallBlue, IBM® Beehive, IBM® Sametime, IBM® Lotus® Connections, etc.) would maintain identities of a group of people working on a project jointly (even if they are not part of a same organization). Any IT resource incident that impacts one of the members of the project can have an impact on the entire project and hence to others (e.g., potential customers associated with the project, etc.) that may not even be directly impacted by the incident.

The computing system 500 utilizes and correlates these various information sources, spanning from social network links to physical network links, in a way that reveals dependencies between business processes and IT resources. Thus, the computing system 500 can also perform a dynamic discovery of the dependencies when some of the (intermediate) associations/affiliations frequently change.

Figure 4:
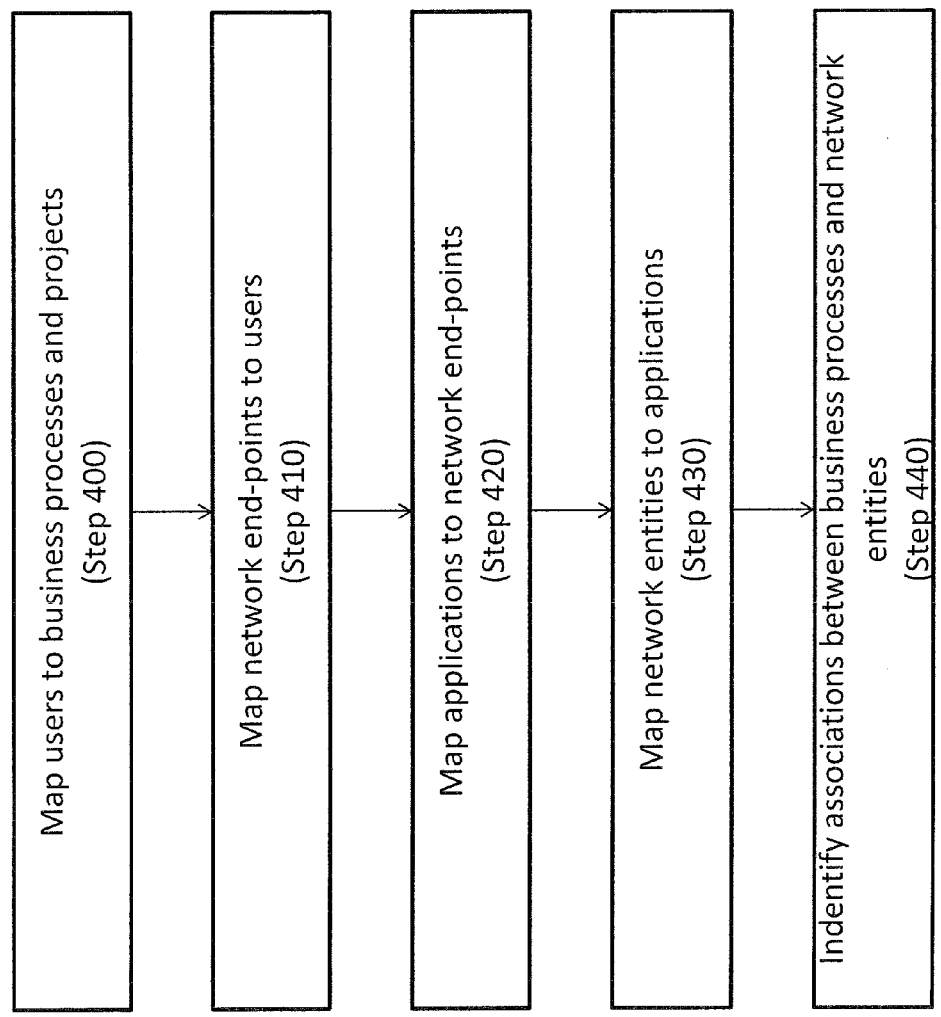
FIG. 4 is a flow chart that describes method steps for determining at least one association among business processes, users, network end-points, applications and network entities in one embodiment.

In one embodiment, the computing system 500 establishes both automatically and dynamically a mapping of business processes to network entities (e.g., server devices, network switches, etc.), e.g., by performing method steps described in FIG. 4. A business process includes, but is not limited to: a business activity (e.g., purchasing a product, etc.), a business project (e.g., marketing a product, etc.).

Figure 6:
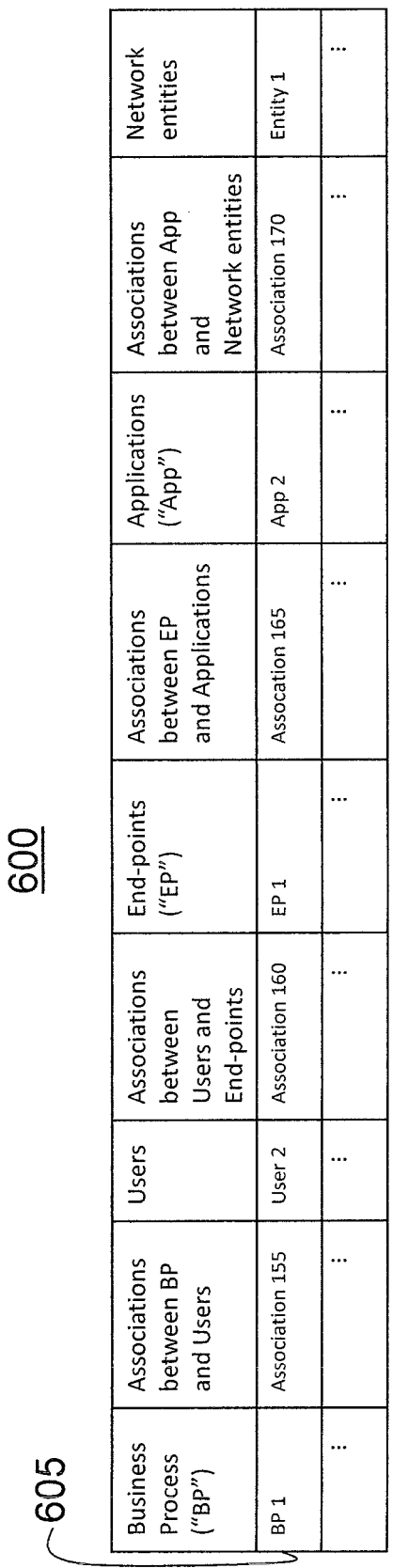
FIG. 6 illustrates an exemplary data structure that stores the mapping shown in FIG. 1 in one embodiment.

In one embodiment, in order to automatically create associations (e.g., an association 125 in FIG. 1) between business processes and physical machines (e.g., network entities 120 in FIG. 1), the computing system 500 uses a multistage process that includes, but is not limited to:

i) a step in which the computing system 500 receives data (e.g., hierarchical organizational charts 225 in FIG. 2 being implemented in a tree data structure) from various resources (e.g., IT department in an organization) and creates mappings for various types of associations as shown in FIG. 1, e.g., by providing, maintaining and updating a data structure (e.g., a table 600 in FIG. 6) that includes entries that associate users and business processes when the computing system 500 finds that the users are involved in the business processes by analyzing the charts 225 (e.g., searching through a tree data structure representing the charts 225). FIG. 6 is described in detail below. In FIG. 1, for example, a software application 1 (135), e.g., Apache HTTP Server application, uses a network entity 1 (130), e.g., a network switch, to be connected to a network (e.g., Internet, Intranet, etc.). A network end-point 3 (140), e.g., a work station computer, runs the software application 1 (135). A user 1 (145), e.g., a system administrator, maintains and/or operates the network end-point 3 (140). The user 1 (145) is involved in a business process 2 (150), e.g., a web hosting service. Thus, the computing system 500 associates the network entity 1 (130), the software application 1 (135), the network end-point 3 (140), the user 1 (145) and the business process 2 (150). In one embodiment, an association is equivalent to a mapping.

ii) a step in which the computing system 500 identifies additional association(s) (i.e., indirect associations) based on the mappings with a use of transitive properties. For example, in FIG. 1, a capability of the network entity 1 (130) affects the business process 2 (150): the network entity 1 (130)→the application 1 (135)→the network end-point 3 (140)→the user 1 (145)→the business process 2 (150). In one embodiment, as described below, a data structure (e.g., table, tree, linked list, graph, etc.) stores the associations. For example, as shown in FIG. 6, each row of the table 600 representing the associations describes these additional associations through transitive properties (e.g., "links" in a linked list, "edges" between nodes in a graph, etc.).

iii) a step in which the computing system 500 infers further associations are based on various clustering and data mining techniques by using the associations identified in step one and the additional associations identified in step two. For example, in FIG. 1, because a user 2 (155) and a user 3 (160) are also involved in the business process 2 (150) and the capability of the network entity 1 (130) affects the business process 2 (150) through the transitive properties, the capability of the network entity 1 (130) also affects the user 2 (155) and the user 3 (160) though the mappings in FIG. 1 do not show any association between the network entity 1 (130) and the users 2-3 (155-160).

Figure 2:
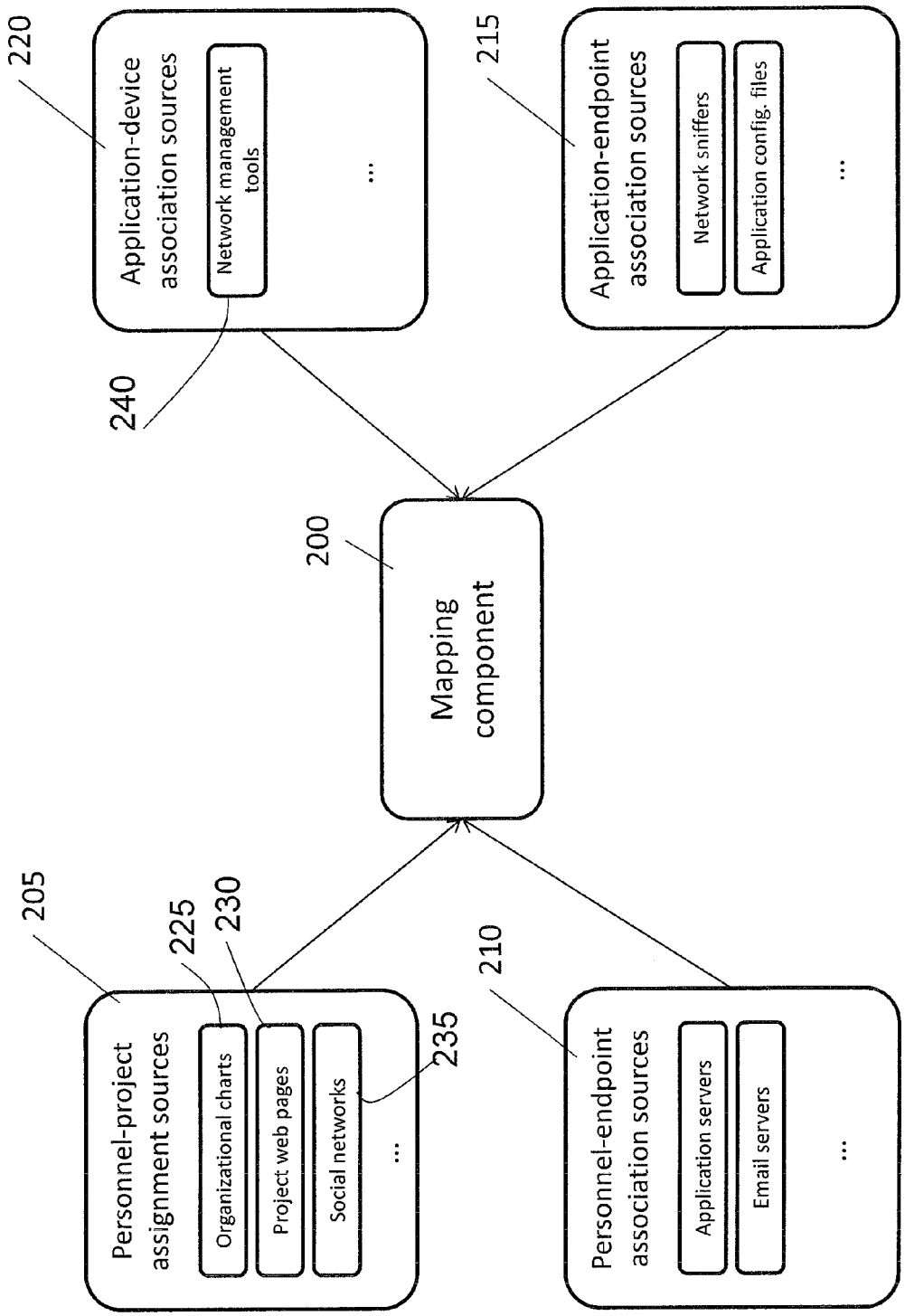
FIG. 2 is a system diagram for determining at least one association among business processes, users, network end-points, applications and network entities in one embodiment.

FIG. 4 is a flow chart that describes method steps for determining at least one association between at least one business process and at least one network entity in one embodiment. FIG. 2 is a system diagram for performing the method steps in FIG. 4 in one embodiment. At step 400 in FIG. 4, a mapping component (e.g., a mapping component 200 in FIG. 2) maps users to business processes and/or projects. In one embodiment, the mapping component 200 includes, but is not limited to: the computing system 500 or any other equivalent computing system. For each user, the mapping component 200 identifies the business processes and/or projects that the user is involved, e.g., by searching through a tree data structure that represents the hierarchical organizational charts 225. This mapping is illustrated in FIG. 1 where the mapping component 200 matches various users 105 to various business processes 100. For example, if a company employee is in a customer-relations management (CRM) department of a company, (s)he will be involved in a number of projects related with certain customers and (s)he will be part of the CRM related business processes of the company. In one embodiment, the mapping component 200 identifies these kinds of relationships between users and business processes and/or projects with which the users are registered and/or involved, e.g., by searching through a tree data structure that represents at least one hierarchical organization chart 225 of the company, project web pages 230 and social networking applications 235 (e.g., Facebook®, Intranet, Internal social networking application, etc.) as shown in FIG. 2. James L. Horton, "Net and Nodes: Social Network Analysis and PR," 2008, http://www.online-pr.com/Holding/Social_Network_analysis_article.pdf, whose contents are wholly incorporated by reference as if fully set forth herein, describes social network analysis in detail. For example, a company's HR (Human Resource) department may list the user under the CRM department. Internal social networking applications and/or project web pages can include information about relations between employees and their memberships in various projects. For example, by applying a data mining technique on a project description web page, the mapping component 200 can identify a membership of a user in a business process and/or project. Pavel Berkhin, "Survey of Clustering Data Mining Techniques," 2002, Accrue Software, Inc., wholly incorporated by reference as if set forth herein, describes various data mining techniques in detail. Similarly, by analyzing information captured in a social network application, the mapping component 200 can identify users that are involved in certain projects. For example, an internal social networking application may provide an organizational chart represented by a tree data structure that describe which users are involved which business processes and/or projects. Searching the tree data structure, the mapping component 200 may find that a particular user is involved in a particular business process or project. Alternatively, by issuing a query (e.g., SQL query) to a database of the company, the mapping component can discover which employees are working which projects.

As shown in FIG. 2, data sources 205 that describe relationships between users and business processes include, but are not limited to: the hierarchical organizational chart 225, project web page 230 and social networking application 235. Upon receiving the relationship description, the mapping component 200 outputs a list of users 105, a list of business processes and/or projects 100 and associations (e.g., an association 155 in FIG. 1) between users and business processes and/or projects as shown in FIG. 1. The associations may be time-dependent and change dynamically, given that users may change projects or organizations over time. There may be a plurality of associations between a plurality of users 105 and a plurality of business processes/projects 100.

Returning to FIG. 4, at step 410, the mapping component 200 maps the user(s) to at least one network end-point (e.g., work station, laptop, smart phone, desktop, netbook, tablet computer, etc.). For each network end-point, the mapping component 200 identifies users that use the network end-point, e.g., by using a network access authentication technique (for example, login ID and password to the network) and by using an application server device (for example, email server device) that is aware of an identity of a user and an IP address of a network end-point. For example, when a user is connected through a wired or wireless Ethernet interface, she or he may be using 802.1X authentication (or a similar type of network access authentication) that verifies a user's identification information to access a particular network end-point, which enables the mapping component 200 to identify an association between the user and a corresponding MAC address of the network end-point and in consequence an association between the user and an IP address of the network end-point. An application server that is aware of an identity of a user and an IP address of a network end-point includes, but is not limited to: SIP (Session Initiation Protocol) proxy servers, IM (Instant Messaging) server devices/applications, e-mail server devices/applications, etc. as shown in source devices/applications 210 (devices or applications that can provide relationships between users and network end-points) in FIG. 2. These application servers provide the mapping component 200 with information (e.g., an array having two elements, etc.) that represent a pair of a user and a network end-point used by the user. After identifying the network end-points and their users, as shown in FIG. 1, the mapping component 200 matches various network end-points 110 to their corresponding users 105. Regardless of which method that mapping component 200 used to identify relationships between users 10 and corresponding network end-points 110, the mapping component 200 maps users 105 (e.g., user IDs) to the network end-points 110 used by the users 105. These mappings between the users and their network end-points are not necessarily static. For example, an IP address of a network end-point may map to different users at different times, which makes the mappings become time-dependent and dynamically change. A user may use more than one network end-points (e.g., a desktop and a smart phone). Then, the mapping component 200 maps the user to all the network end-points that the user uses. There may be a plurality of associations (mappings), e.g., an association 160 in FIG. 1, between a plurality of users 105 and a plurality of network end-points 110.

Returning to FIG. 4, at step 420, the mapping component 200 maps the network end-points to at least one application. This mapping associates each network end-point with applications used by that network end-point as shown by associations (e.g., an association 165 in FIG. 1) between network end-points 110 and applications 115 in FIG. 1. Applications 115 include, but are not limited to: network based-applications (e.g., a web browser, etc.) that operate based on a client-server model. A client can be either a) an end-user, for example, in a case of web-based applications where the client is a web browser and a server is a web server (e.g., Apache HTTP server application), or b) other applications, for example, a web server which becomes a client of an application server. The mapping component 200 identifies associations between network end-points 110 and applications 115, e.g., by snooping of a network traffic that enables a discovery of pairs of network end-points that communicate with each other. Snooping network traffic reveals information including, but not limited to: a pair (e.g., an array having two elements) of an IP address of a client device and an IP address of a server device accessed by the client device. By observing a socket connection (e.g., a data port) in a network end-point or by performing a deep packet inspection (i.e., a technique that monitors data traffic in a network for troubleshooting network problems and/or block viruses and worms), the mapping component 200 can further identify specific applications (e.g., a database application in the server device accessed by the client device) that are used in the communication between those pair network end-points. M. Chris Riley, et al., "Deep Packet Inspection: The End of The Internet As We know it?", Free Press, March, 2009, wholly incorporated by reference as if set forth herein, describes deep packet inspection in detail. For example, a data packet (e.g., a TCP packet) includes source port information (e.g., 16-bit information representing a network end-point that provides data, e.g., emails, texts, etc., to another network end-point) and destination port information (e.g., 16-bit information representing a network end-point that receives data, e.g., emails, texts, etc., from another network end-point). These source port information and destination port information may reveal associations (e.g., network connections or communications) between two different network end-points. Furthermore, the mapping component 200 may parse application configuration files in a server device and/or a client device, which can reveal a composition of applications per network end-point. By parsing the configuration file of a server and/or client device, the mapping component 200 can identify applications that the server or client device is accessing. As shown in FIG. 2, by using source files and/or tools 215 (e.g., network sniffer, network snooper, network analyzer, and/or parser of configuration files), the mapping component 200 identifies associations between applications and network end-points as described above. The associations between the network end-points 110 and applications 115 are also time-dependent and dynamically changing, given that both the applications and locations of the network end-points can change over time. There may be a plurality of associations (mappings), e.g., an association 165 in FIG. 1, between a plurality of network end-points 110 and a plurality of applications 115.

Returning to FIG. 4, at step 430, the mapping component 200 maps the applications to at least one network entity (e.g., servers, switches, firewalls, load balancers, routers, etc.). The mapping component 200 identifies associations between the applications and network entities, e.g., by using a network topology discovery technique. Richard Black, et al., "Ethernet Topology Discovery without Network Assistance," Proceeding of the 12$^{th}$ IEEE International Conference on Network Protocols (ICNP'04), 2004, wholly incorporated by reference as if set forth herein, describes a network topology discovery technique in detail. A network management tool 240 (e.g. HP® Automated Network Management (ANM) Solution) may include tools implementing a network topology discovery technique. By using a source tool 220 (e.g., the network management tool 240) that provides information of a network configuration, the mapping component 200 identifies associations (e.g., an association 125 in FIG. 1) between applications 115 and the network entities 120. For example, the network management tool 240 may provide an access history of a network entity to the mapping component 200. The access history may include, but is not limited to: when a particular application accessed a particular network entity (for example, a web browser accessed a router to store a file in a remote storage at a particular time). The associations between network entities and applications may be also time-dependent and dynamically change. There may be a plurality of associations (mappings), e.g., an association 125 in FIG. 1, between a plurality of network entities 120 and a plurality of applications 115.

Returning to FIG. 4, at step 440, the mapping component 200 identifies associations between the business processes 100 and network entities 120 through the transitive properties (e.g., "links" in a linked list, "edges" between nodes in a graph, etc.). For example, using the transitive property of the associations identified in steps 400-430 and taking into consideration the time-dependence of those associations, the mapping component 200 identifies a plurality of time-dependant associations between the business processes and the network entities: network entities 120→applications 115→network end-points 110→users 105→business processes 100, wherein "→" represents a direction association (e.g., a user "is involved in" a business process/project). Similarly, the mapping component 200 identifies direct or indirect associations among business processes/projects, users, network end-points, applications and network entities. For example, in FIG. 1, the mapping component 200 identifies a direct association between a user and a network end-point: the user 1 (145) uses a network end-point 3 (140), e.g., by using a network access authentication technique. The mapping component 200 also identifies an indirect association between a business process and a network end-point: the user 1 (145) is involved in the business process 2 (150), and thus a capability of the network end-point 3 (140) that is used by the user 1 (145) affects the business process 2 (150).

FIG. 6 illustrates an exemplary data structure that stores the mapping shown in FIG. 1 in one embodiment. In this embodiment, each business process has a unique ID (Identification) number (not shown). Each user also has a unique ID number. Each IT resource (e.g., End-points, Network entities, etc.) also has a unique ID number. Each association also has a unique ID number. An ID number of "Association 155" may be, for example, $10000155_{10}$. These ID numbers distinguish each user, each IT resource, each association and each business process from each other. In this embodiment, the mappings are stored in a table 600 that can be implemented as a linked list, vector, a tree, a graph, or any other data structure. Each row of the table 600 represents mappings between a network entity and a business process through one or more transitive properties. For example, a first row 605 of the table 600 describes that a network entity 1 is mapped to a business process 1 through associations 155, 160, 165 and 170. The mapping component 200 stores the table 600, e.g., in a database (not shown) and/or a storage device (e.g., a disk drive, optical disc, tape, etc.). Alternatively, a database (not shown) associated with the business processes and/or the users may include multiple tables, for example, one table that includes the users, one table that includes the business processes, one table that includes the applications, etc. These tables may include entries to indicate the associations. There may be a separate table that includes the associations. The associations may also be implemented, e.g., by using XML documents, serializable Java objects (i.e., Java objects that can be stored in a file or a storage device through serialization (a process converting a data structure to a binary representation)), etc.

In one embodiment, the mapping component 200 extends an association between an application and a user to an association between that application to all users that work under the same project. Traditionally, for example, if a user U has never used an application A, while other users, who are working under a same project P as the user U, use the application A frequently, traditional IT resource management system does not identify a mapping between the user U and the application A. However, actually, it is quite possible that the user U may use application A in a future, or the user U may indirectly depend on the application A through some other users under the same project P. In the above example, the mapping component 200 infers that the application A is associated with the user U due to the fact that other users under the same project use that application A. This inference can be done with various graph clustering algorithms. Gary William Flake, et al., "Graph Clustering and Minimum Cut Trees," Internet Mathematics Vol. 1, No. 4, pp. 385-408, September, 2003, wholly incorporated by reference as if set forth herein, describes a graph clustering algorithm in detail. For example, if the user U is a part of a graph cluster that represents users that are under the same projects and the majority of the users under that project access the application A, then the mapping component 200 determines that all users under the same cluster have an association with the application A. All the users under the same cluster may belong to a same organizational division or group.

In one embodiment, the mapping component 200 infers an additional association among the business processes 100, the users 105, the network end-points 110, the applications 115 and the network entities 120 based on the associations identified in method steps 400-440 in FIG. 4, e.g., by using one or more of: a social networking discovery technique, a clustering technique and a data mining technique. For example, by using a social network graph (not shown), a mapping component 200 can infer that a user U may be associated with a project P even if the inferred association is not directly discoverable from the identified associations in method steps 400-440 in FIG. 4. The mapping component 200 assumes that there is an additional association between the user U and the project P when numerous neighbors or friends of the user U in the social graph, with which person U shares common meetings, are under a common project to which the user U appears not assigned based on the associations identified in method steps 400-440 in FIG. 4. However, under this circumstance, the mapping component 200 determines that it is highly likely that the user U is also assigned to the same project P even if the additional association is not identified through the method steps 400-440 in FIG. 4 (for example, due to incomplete organization chart). The mapping component 200 increases this likelihood if the neighbors or friends of the user U share other common attributes, e.g., using a same set of machines, a same set of tools, having a same project manager, etc. Given all these attributes, the mapping component 200 determines that there are additional associations not identified, e.g., by using various clustering and data mining techniques.

In one embodiment, the mapping component 200 assigns a confidence value to each of associations (including the identified associations and the additional associations), for example ranging from 0 to 1, based on a quality of an inference and/or identification. A confidence value of 1 represents that the corresponding association has been completely identified, a value of 0 represents that there is no association, and any value between 1 and represents that the association has been inferred or assumed. A confidence value close to 1 represents that the corresponding association is almost certain while a confidence value close to 0 represents that the corresponding association is less likely to be true.

In order to deal with stale data (e.g., incorrect or outdated organizational chart, etc.), the mapping component 200 calculates confidence values for all associations, independently from whether they have been identified or inferred, e.g., by using clustering and data mining techniques. For example, the mapping component 200 may initially assume that due to stale or incorrect data, a user U appears to be associated with a project P, even if the user U is no longer working on the project P. It is possible for the mapping component 200 to remove or assign a low confidence value to this incorrect association, e.g., by identifying all users working on the project P and identifying common attributes between them. Such attributes include, but are not limited to: their meeting schedules, the machines and tools that they are using, their direct associations in a social network graph, sharing some distinguished node(s) in the social graph (for example, same project managers), etc. If the user U appears to share no common attributes with any of the other users associated with the project P, then the mapping component 200 determines that U is not associated with P, and/or assigns a low confidence value (e.g., 0.1) to this association. In one embodiment, the mapping component 200 removes inferred associations whose confidence values are less than a threshold value (e.g., 0.3).

Figure 3:
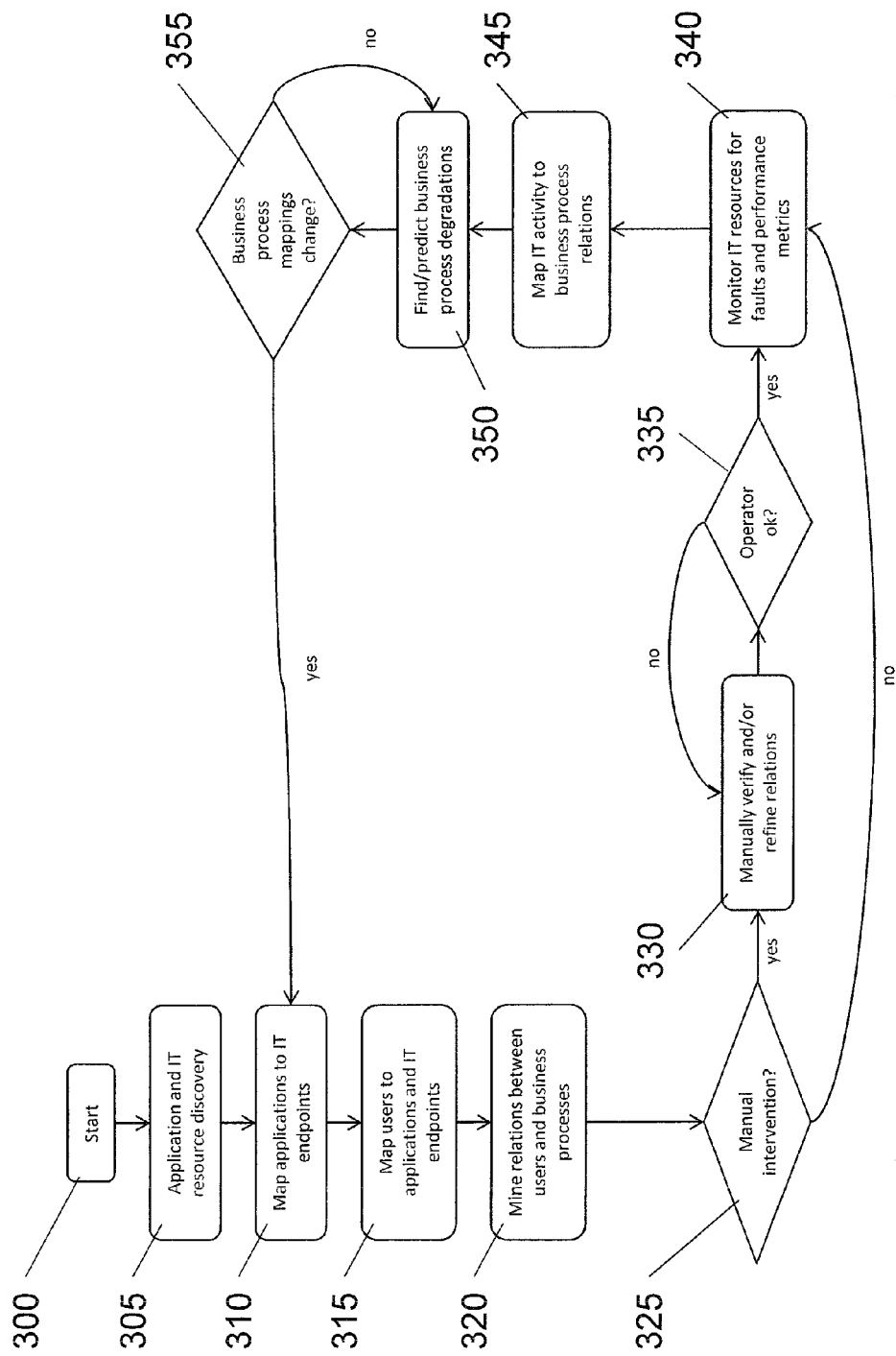
FIG. 3 is a flow chart that describes overall operations of a mapping component in one embodiment.

FIG. 3 is a flow chart that describes method steps for both generating and monitoring the mappings performed by the mapping component 200 in one embodiment. At step 300, a user starts to operate a computing system (e.g., a computing system 500 in FIG. 5). At step 305, the computing system 500 automatically discovers a set of applications and IT resources. Andrew Smithson, et al., "Engineering an Agent-Based Peer-To-Peer Resource Discovery System," First International Workshop, AP2PC 2002, wholly incorporated by reference as if set forth herein, describes a technique to discover applications and IT resources in detail. Nikolai Joukov, et al., "Built-to-Order Service Engineering for Enterprise IT Discovery," 2008 IEEE International Conference on Services Computing, Jul. 8-11, 2008, wholly incorporated by reference as if set forth herein, describes another technique to discover applications and IT resources in detail. The mapping component 200 uses these discovered applications and IT resources for identifying mappings/associations, e.g., by performing method steps 400-440 in FIG. 4. At steps 310-315, the mapping component 200 performs the method steps 400-410 to identify mappings among business processes 100, users 105, network end-points 110, applications 115 and network entities 120. At step 320, the mapping component 200 infers additional associations among business processes 100, users 105, network end-points 110, applications 115 and network entities 120 as described above, e.g., by using clustering and/or data mining techniques.

At step 315, a user may manually intervene to improve quality of the identified and inferred mappings, e.g., by manually verifying and/or refining these mappings. If the manual intervention does not occur, at step 340, the computing system 500 immediately starts to monitor the discovered IT resources for faults and other performance-related metrics. If the manual intervention occurs, at step 330, a user manually verifies and/or refines the identified and inferred mappings. At step 335, an authority agent (e.g., a data center manger) may further evaluate whether results of the manual intervention are satisfactory (i.e., there is no further improvement necessary). If the results of the manual intervention are satisfactory, at step 340, the computing system 500 starts to monitors the discovered IT resources for faults and other performance-related metrics. Otherwise, at step 330, the user performs the manual verification and/or refinement again.

At 345, the computing system 500 matches the monitored activities of the IT resources to the business processes. This step can be conducted in a number of various ways. For example, a collection of IT resources' fault events or performance data can be continuously maintained, e.g., in a database, for corresponding business processes of the IT resources that are identified by mappings as shown in FIG. 1. In another example, events and data exhibiting specific properties (e.g., events of a specific severity or data beyond a specific threshold) are maintained, e.g., in a database, for the corresponding business processes. In another example, the computing system 500 calculates statistics of IT resources' fault and performance activities, and maintains in a database (a set of) the calculated statistics for corresponding business processes.

At step 350, the computing system 500 uses the identified mappings, inferred additional mappings and the monitored activities of the IT resources to find or predict business process degradations, e.g., by applying data mining technique, machine learning technique, and statistical methods on these mappings and the monitored activities. Aurangzeb Khan, et al., "A Review of Machine Learning Algorithms for Text-Documents Classification," Journal of Advances in Information Technology, vol. 1, no. 1, February 2010, wholly incorporated by reference as if set forth herein, describes various machine learning techniques (e.g., decision tree). A statistical method includes, but is not limited to: Analysis of variance, Chi-square test, Correlation, Mean square weighted deviation, Regression analysis, Student's t-test, Time series analysis, etc. Kevin P. Murphy, "Linear regression," Mar. 13, 2007, http://citeseerx.ist.psu.edu/viewdoc/summary?doi=10.1.1. 121.3661, whose whole contents are wholly incorporated by reference as if set forth herein, describes a statistical technique (regression technique) in detail. For example, assume a scenario in which there are business processes that are involved with filing claims or certain time-sensitive customer service tasks. In this example, if an average length of time or frequency at which a packet delays among specific network end-points is higher than a certain threshold, then the computing system 500 infers that IT resources (e.g., network switches between the network end-points) negatively affects the business processes due to the their time sensitive natures. Then, the computing system 500 sends an electronic notification (e.g., alerts, emails, instant messaging, etc.) to the negative affected business process team (or a user in the business process team) to warn of a potential negative impact (e.g., a potential delay imposed on the business process) of the IT resources on the business process. As another example, the computing system 500 uses a certain pattern or combination of IT resource faults (e.g., lack of memory warnings and null pointer exceptions (and possibly other faults events)) on specific server devices to predict that a progress of an associated business process may be delayed because troubleshooting and maintenance tasks will be conducted on the specific server devices before any other business-related activities can commence on the associated business process. As described in these examples, the computing system 500 predicts or detects the business process degradation (e.g., a delay in the business process, missing a target delivery date of a product prototype, etc.) based on one or more of: the identified mappings, inferred mappings and monitored activities of the IT resources. For example, in FIG. 6, if the network entity 1 becomes unavailable due to a power outage, then the computing system 500 finds that the business process 1 is affected by the unavailable network entity 1 through the associations 155-170 according to the first row 605 of the table 600.

At step 355, the mapping component 200 evaluates whether the identified or inferred mappings have been changed, e.g., by monitoring changes in connections among users in a social network graph and/or evaluating the confidence values on the associations. For example, if a confidence value on an association falls below a predetermined value, then the mapping component 200 determines that the association is no longer valid and that the mappings have been changed. Alternatively, periodically, users can be directly queried to confirm their relationships to some business processes/projects. If no mappings have changed, then the finding and/or predicting business process degradations occurs again at step 350. However, if it is determined that a mapping, or set of mappings, has changed, then the control returns to the step 310 to identify new mappings.

Figure 5:
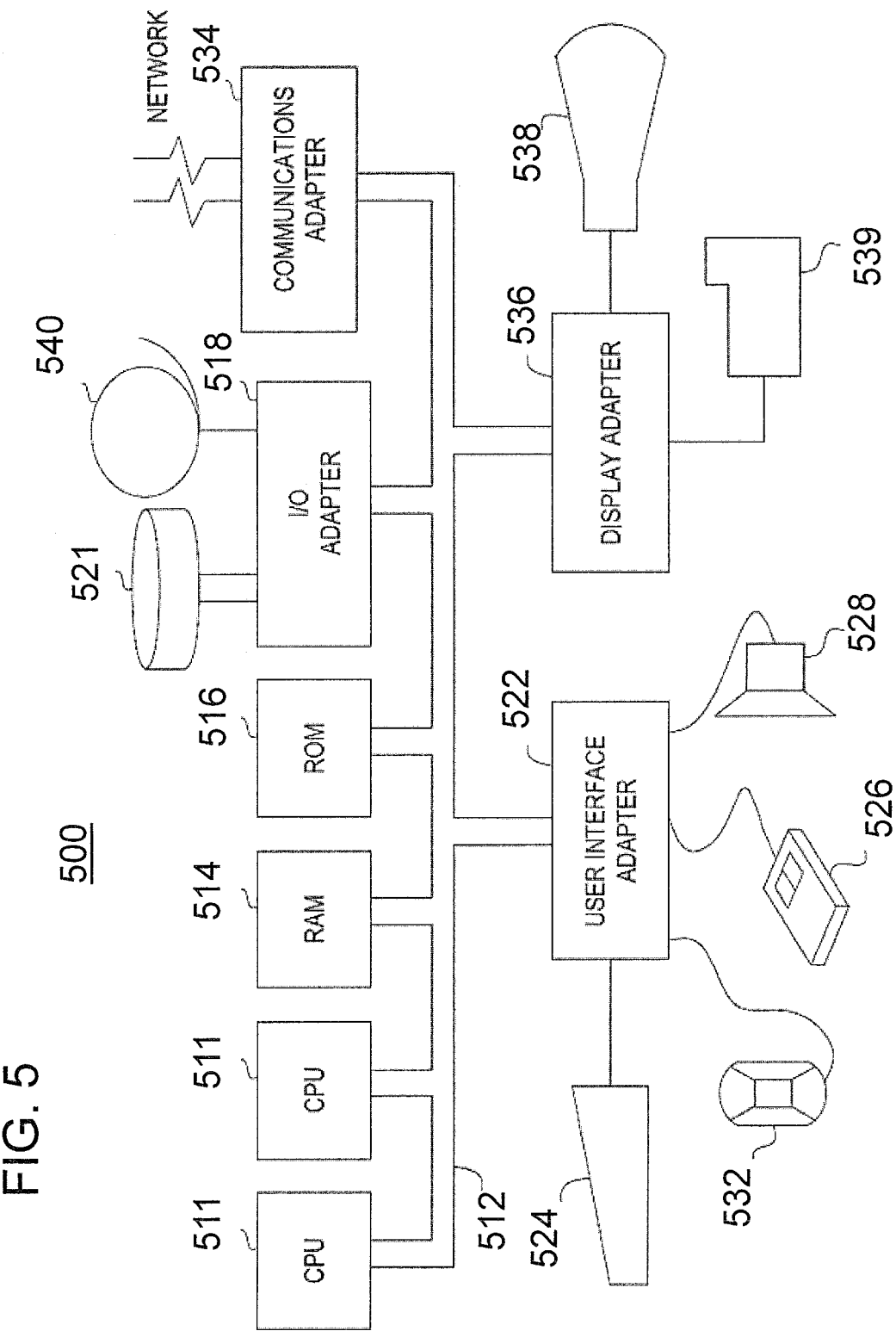
FIG. 5 illustrates an exemplary hardware configuration of the mapping component in one embodiment.

FIG. 5 illustrates an exemplary hardware configuration of the computing system 500. The hardware configuration preferably has at least one processor or central processing unit (CPU) 511. The CPUs 511 are interconnected via a system bus 512 to a random access memory (RAM) 514, read-only memory (ROM) 516, input/output (I/O) adapter 518 (for connecting peripheral devices such as disk units 521 and tape drives 540 to the bus 512), user interface adapter 522 (for connecting a keyboard 524, mouse 526, speaker 528, microphone 532, and/or other user interface device to the bus 512), a communication adapter 534 for connecting the system 500 to a data processing network, the Internet, an Intranet, a local area network (LAN), etc., and a display adapter 536 for connecting the bus 512 to a display device 538 and/or printer 539 (e.g., a digital printer of the like).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with a system, apparatus, or device running an instruction.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof, A computer readable signal medium may be any computer readable medium that is not a computer readable storage medium and that can communicate, propagate, or transport a program for use by or in connection with a system, apparatus, or device running an instruction.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which run on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more operable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. An automatic method for determining at least one association between at least one business process and at least one network entity, the method comprising:
    mapping at least one user to the business process;
    mapping the user to at least one network end-point;
    mapping the network end-point to at least one application;
    mapping the network entity to the application; and
    identifying the association among the business process, the user, the network end-point, the application and the network entity based on one or more of the mappings,
    wherein a computing system including at least one processor performs one or more of: the mappings and the identifying.

2. The method according to claim 1, wherein the mapping the user to the business process includes one or more of: using a data mining algorithm and issuing a database query to a database associated with the user or the business process.

3. The method according to claim 1, wherein the mapping the user to the network end-points includes one or more of: using a network access authentication technique and using an application server that is aware of an identity of the user and an IP (Internet Protocol) address of the network end-point.

4. The method according to claim 1, wherein all the mappings are time-dependent and dynamically changing.

5. The method according to claim 1, wherein the mapping the network end-points to the application includes one or more of: snooping a network traffic between various network end-points, performing a deep packet inspection between the network end-points, and parsing application configuration files in a server device or a client device.

6. The method according to claim 1, wherein the mapping the network entity to the application uses a network topology discovery technique.

7. The method according to claim 1, further comprising:
    inferring an additional association among the business process, the user, the network end-point, the application and the network entity based on one or more of the mappings by using one or more of: a social networking discovery technique, a clustering technique and a data mining technique.

8. The method according to claim 7, further comprising:
    assigning a value to each association found by the inferring and the mappings; and
    removing an association if a corresponding association value is less than a threshold.

9. The method according to claim 1, further comprising:
    improving quality of the mappings by verifying or refining the mappings.

10. The method according to claim 1, further comprising:
    predicting a future degradation of the business process based on the mappings; and
    notifying the predicted future degradation to a user or multiple users in the business process.

11. A system for determining at least one association between at least one business process and at least one network entity, the system comprising:
    a memory device; and
    a processor being connected to the memory device,
    wherein the processor performs steps of:
        mapping at least one user to the business process;
        mapping the user to at least one network end-point;
        mapping the network end-point to at least one application;
        mapping the network entity to the application; and
        identifying the association among the business process, the user, the network end-point, the application and the network entity based on one or more of the mappings.

12. The system according to claim 11, wherein the mapping the user to the business process includes one or more of: using a data mining algorithm and issuing a database query to a database associated with the user or the business process.

13. The system according to claim 11, wherein the mapping the user to the network end-points includes one or more of: using a network access authentication technique and using an application server that is aware of an identity of the user and an IP (Internet Protocol) address of the network end-point.

14. The system according to claim 11, wherein all the mappings are time-dependent and dynamically changing.

15. The system according to claim 11, wherein the mapping the network end-points to the application includes one or more of: snooping a network traffic between various network end-points, performing a deep packet inspection between the network end-points, and parsing application configuration files in a server device or a client device.

16. The system according to claim 11, wherein the mapping the network entity to the application uses a network topology discovery technique.

17. The system according to claim 11, wherein the processor further performs:
    inferring an additional association among the business process, the user, the network end-point, the application and the network entity based on one or more of the mappings by using one or more of: a social networking discovery technique, a clustering technique and a data mining technique.

18. The system according to claim 17, wherein the processor further performs steps of:
    assigning a value to each association found by the inferring and the mappings; and
    removing an association if a corresponding association value is less than a threshold.

19. The system according to claim 11, wherein the processor further performs steps of:
    improving quality of the mappings by verifying or refining the mappings;
    predicting a future degradation of the business process based on the mappings; and
    notifying the predicted future degradation to a user or multiple users in the business process.

20. A computer program product for determining a vehicle arrival time, the computer program product comprising a storage medium excluding only a propagating signal, the storage medium readable by a processing circuit and storing instructions run by the processing circuit for performing a method, the method comprising:
    mapping at least one user to the business process;
    mapping the user to at least one network end-point;
    mapping the network end-point to at least one application;
    mapping the network entity to the application; and
    identifying the association among the business process, the user, the network end-point, the application and the network entity based on one or more of the mappings.

* * * * *